(12) United States Patent
Al-Haj Ali et al.

(10) Patent No.: US 11,981,761 B2
(45) Date of Patent: May 14, 2024

(54) PROCESS FOR OBTAINING LOW VOLATILE PLASTOMERS

(71) Applicant: BOREALIS AG, Vienna (AT)

(72) Inventors: Mohammad Al-Haj Ali, Espoo (FI); Vasileios Kanellopoulos, Linz (AT); Michiel Bergstra, Valkenswaard (NL)

(73) Assignee: BOREALIS AG, Vienna (AT)

( * ) Notice: Subject to any disclaimer, the term of this patent is extended or adjusted under 35 U.S.C. 154(b) by 757 days.

(21) Appl. No.: 16/959,348

(22) PCT Filed: Jan. 15, 2019

(86) PCT No.: PCT/EP2019/050921
§ 371 (c)(1),
(2) Date: Jun. 30, 2020

(87) PCT Pub. No.: WO2019/141672
PCT Pub. Date: Jul. 25, 2019

(65) Prior Publication Data
US 2021/0024669 A1 Jan. 28, 2021

(30) Foreign Application Priority Data
Jan. 17, 2018 (EP) .................................... 18152162

(51) Int. Cl.
*B29B 9/16* (2006.01)
*B29B 9/06* (2006.01)
*C08F 210/16* (2006.01)
*B29K 23/00* (2006.01)

(52) U.S. Cl.
CPC ............ *C08F 210/16* (2013.01); *B29B 9/065* (2013.01); *B29B 9/16* (2013.01); *B29B 2009/168* (2013.01); *B29K 2023/08* (2013.01)

(58) Field of Classification Search
CPC .................................. B29B 9/065; B29B 9/16
See application file for complete search history.

(56) References Cited

U.S. PATENT DOCUMENTS

| | | | |
|---|---|---|---|
| 3,931,130 A | 1/1976 | Beining | |
| 5,326,855 A | 7/1994 | Kahn | |
| 9,216,548 B2 | 12/2015 | Karbasi et al. | |
| 2004/0132964 A1 | 7/2004 | Mulgrew et al. | |
| 2012/0003478 A1 | 1/2012 | Matsumura et al. | |
| 2021/0024669 A1 | 1/2021 | Al-Haj Ali et al. | |

FOREIGN PATENT DOCUMENTS

| | | |
|---|---|---|
| CN | 1316295 A | 10/2001 |
| CN | 1505642 A | 6/2004 |
| CN | 1711286 A | 12/2005 |
| CN | 102089072 A | 6/2011 |
| EP | 0735053 A1 | 10/1996 |
| EP | 2251375 A1 | 11/2010 |
| EP | 2913345 A1 | 9/2015 |
| EP | 2913346 A1 | 9/2015 |
| EP | 3023450 A1 | 5/2016 |
| EP | 3184166 A1 | 6/2017 |
| EP | 3184167 A1 | 6/2017 |
| EP | 2251375 A1 | 10/2017 |
| EP | 3239195 A1 | 11/2017 |
| IN | 201917016918 A | 8/2019 |
| WO | 9313843 A1 | 7/1993 |
| WO | 2004039848 A1 | 5/2004 |
| WO | 2008/015228 A2 | 2/2008 |
| WO | 2014032794 A1 | 3/2014 |
| WO | 2018114071 A1 | 6/2018 |
| WO | 2018219805 A1 | 12/2018 |
| WO | 2019141672 A1 | 7/2019 |

OTHER PUBLICATIONS

Canadian Examination Report for Application No. 3082038 dated May 26, 2021; 4 pgs.
Applicant: Borealis AG; "Process for Obtaining Low Volatile Plastomers"; Singapore Patent Application No. 11202004524P; Singapore Office Action; dated Jul. 22, 2021; 10 pgs.
Stewart, P. S. B., & Davidson, J. F. (1967). Slug flow in fluidized beds. Powder Technology, 1, 61.
International Search Report for Application No. PCT/EP2019/050921 dated Mar. 28, 2019.
Applicant: Borealis AG; "Process for Obtaining Low Volatile Plastomers"; Chinese Application No. 201980006143.4; Chinese Office Action; dated Mar. 17, 2022; 18 pgs.
India Examination Report for Application No. 202017032959 dated Mar. 30, 2021; 6 pgs.
United Arab Emirates Application No. P6000972/2020, Office Action dated Dec. 13, 2023.

*Primary Examiner* — Jacob T Minskey
(74) *Attorney, Agent, or Firm* — TAROLLI, SUNDHEIM, COVELL & TUMMINO L.L.P.

(57) ABSTRACT

Process for reducing the volatile organic compound content of plastomer having a density of equal to or lower than 883 kg/m3 and—a MFR2 of 100.0 g/10 min or lower (ISO 1133 at 2.16 kg load and 190° C.); to below 65 ppm (VOC, VDA277), the process comprising the steps of a) providing raw plastomer in granular form, the raw plastomer having a density of equal to or lower than 883 kg/m3; and a MFR2 of 100.0 g/10 min or lower (ISO 1133 at 2.16 kg load and 190° C.); and a volatile organic compound content (VOC, VDA277) of above 150 ppm, and the granules having an average D50 diameter of 2.5 to 4.5 mm b) subjecting said granular raw plastomer to at least one intensive hydrodynamic regime at a minimum temperature of at least 20° C. and a maximum temperature of 4° C. below the Vicat temperature (10 N, ISO 306) of the granular raw plastomer or 35° C., whatever value is lower, with the temperature measured at the gas inlet to the fast-fluidization regime, c) recovering the granular plastomer.

13 Claims, No Drawings

PROCESS FOR OBTAINING LOW VOLATILE PLASTOMERS

The present invention relates to a process for obtaining plastomers with low volatile organic compounds (VOC) content and to a process for reducing the volatile organic compound content of granular plastomers to below 65 ppm (VOC, VDA277).

BACKGROUND

The removal of volatile organic compounds from plastomers is challenging due to their intrinsic stickiness and agglomeration tendency above a relatively low temperature resulting in a limited temperature window and particularly challenging for plastomers produced in solution polymerization due to relative high VOC content. Various attempts for dealing with these problems have been made. Usually hydrocarbons are purged from plastomers obtained via solution polymerization in one or more flash columns. Frequently purge columns using and inert gas stream and/or steam dryer using water steam are optionally and additionally applied for separating hydrocarbons.

EP 735 053 is concerned with a method of stripping oligomers from finely divided, substantially crystalline, α-olefin polymer particles in a fluidized bed and at a temperature avoiding agglomeration of the fine particles. EP 735 053 particularly concerns the treatment of as-polymerized particles commonly known as flake having an average particle size of 0.25 mm to 2.00 mm. Exemplary temperatures of 100 to 140° C. and treatment times of 1 to 3 hours are given. In a further aspect EP 735 053 believes reducing concentration of oligomers below 250 ppm does not have any useful effect.

WO93/13843 pertains to a process for removing hydrocarbon from polymer slurry as obtained by solution polymerization, comprising a flash separation as a first stage, further treatment of the slurry in a fluid bed dryer utilizing heated hydrocarbon as the stripping gas as a second stage. The resulting polymer from the fluid bed dryer is then transferred to a silo, wherein additional hydrocarbon is removed by use of heated purge gas flow countercurrent to the polymer as a third stage. Finally, the polymer output is subjected to further processing such as extrusion into pellets.

U.S. Pat. No. 5,326,855 concerns inter alia a process for treating a rubber compound in a fluid bed dryer.

Lowering the VOC of plastomers to very low contents such as below 65 ppm still is time consuming and insofar a significant limitation as to the overall time required. In addition to that, treatment of polymer particles in a silo under packed-bed conditions still results in in-homogeneities as to the volatile concentration within the individual particles, meaning there is still a significant VOC-distribution within the individual particle.

Thus, there was still the need for an improved process for reducing volatiles from plastomers at reasonable low temperature enabling higher efficiency, particularly shortened treatment times. There was also the need for having a more even VOC-distribution within the individual granules of granular plastomer.

DESCRIPTION

The present invention is based on the finding, that the volatile content of plastomers having densities of equal to or lower than 883 kg/m³ and having a MFR$_2$ of 100 g/10 min or lower (ISO 1133 at 2.16 kg load and 190° C.) containing initially volatile organic compounds (VOC, VDA277) of above 150 ppm can be efficiently reduced by providing said plastomers in granular form at an average D50 particle size of 2.5 to 4.5 mm and subjecting said granular particles to a fast-fluidization regime at temperatures of up to a maximum temperature of 4° C. below the Vicat temperature (10 N, ISO 306) of the granular raw plastomer or 35° C., whatever value is lower.

The present invention insofar provides a process for reducing the volatile organic compound content of plastomer having
   a density of equal to or lower than 883 kg/m³ and
   a MFR$_2$ of 100.0 g/10 min or lower (ISO 1133 at 2.16 kg load and 190° C.);
   to below 65 ppm (VOC, VDA277), the process comprising the steps of
a) providing raw plastomer in granular form, the raw plastomer having
   a density of equal to or lower than 883 kg/m³; and
   a MFR$_2$ of 100.0 g/10 min or lower (ISO 1133 at 2.16 kg load and 190° C.); and
   a volatile organic compound content (VOC, VDA277) of above 150 ppm, and
   the granules having an average D50 diameter of 2.5 to 4.5 mm
b) subjecting said granular raw plastomer to at least one intensive hydrodynamic regime at a minimum temperature of at least 20° C. and a maximum temperature of 4° C. below the Vicat temperature (10 N, ISO 306) of the granular raw plastomer or 35° C., whatever value is lower, with the temperature measured at the gas inlet to the intensive hydrodynamic regime,
c) recovering the granular plastomer.

In a further aspect, the present invention is also concerned with granular plastomer obtainable by the inventive process.

In yet a further aspect, the present invention is concerned with the use of the inventive process for homogenizing volatile concentration within the granules obtained. The present invention further concerns the use of the process according to the present invention for minimizing treatment time when reducing the volatile organic compound content of raw plastomer having a volatile organic compound content (VOC, VDA277) of above 150 ppm, to below 65 ppm (VOC, VDA277) for the resulting plastomer.

Definitions

Volatile organic compound content (VOC, VDA277) is a measure of emissions from plastic materials such as low density plastomers which are caused by low-molecular components in the polymer material. These low-molecular components can be residual monomers, oligomers, additives, plasticizers and/or degradation products.

The term granular such as used herein denotes a plastomer in the form of pellets and/or granulated material. For example, pellets can be formed by forcing the plastomer melt through a die and pelletizing it subsequently with an underwater granulator.

Plastomers such as used herein are ethylene alpha olefin copolymers which combine properties of elastomers and plastics, i.e. they have rubber-like properties and the processability of plastic.

The term "intensive hydrodynamic regime" differentiates from packed beds. The term "intensive hydrodynamic regime" requires that the superficial gas flow velocity is higher than the minimum fluidization velocity.

As a matter of definition, a "slugging regime" shall fulfill the criteria as set forth by Stewart and Davidson (Stewart, P. S. B., & Davidson, J. F. (1967). Slug flow in fluidized beds. Powder Technology, 1, 61.) incorporated by reference herewith.

A "double cone regime" denotes a turbulent bed and the presence of a lower and upper cone geometry of the treatment vessel. Such geometries have been described inter alia in WO-A-2014032794, EP-A-2913346, EP-A-2913345, EP-A-3184166 and EP-A-3184167.

DETAILED DESCRIPTION

It has been surprisingly found that reduction of VOC in plastomers is efficiently achieved by using granular plastomer having an average D50 particle size of between 2.5 and 4.5 mm (measured according to the method described herein) as the starting material under intensive hydrodynamic regimes. It was previously assumed, optimal reduction of volatiles or similar matter should use as-reactor polymers, i.e. small polymer particles not subjected to a compounding step, in the form of flakes having an average particle size of below 2 mm. However, the inventors of the present invention have surprisingly found the volatile concentration inside granular plastomer having an average D50 particle size of between 2.5 and 4.5 mm, i.e. substantially bigger size than flakes is surprisingly good when applying the inventive process. In a further aspect, the inventive process turned out to result in significant time savings when compared to traditional aeration processes applying pelletization as a final step after the treatment in an intensive hydrodynamic regime or aeration of a packed bed.

In the process according to the present invention the granular raw plastomer has an average D50 particle size of between 2.5 and 4.5 mm measured according to the method described herein.

The granular raw plastomer is provided in a treatment vessel. In the simplest form this can be any vessel or pipe allowing the provision of a intensive hydrodynamic regime. Usually the treatment vessel will be a conventional gas phase reactor. When the intensive hydrodynamic regime is a double cone regime, such treatment vessel is further characterized by a double cone geometry, i.e. has a bottom cone and a top cone.

The granular raw plastomer according to the present invention has a MFR$_2$ of 100 g/10 min or lower, preferably of 20 g/10 min or lower and even more preferably of 6 g/10 min or lower.

The granular plastomer has a density of 883 kg/m$^3$ or lower, more preferably of 870 kg/m$^3$ or lower.

The temperature as measured at the gas inlet to the intensive hydrodynamic regime according to the present invention has a minimum temperature of at least 20° C. Furthermore, the maximum temperature is 4° C. below the Vicat temperature (10 N, ISO 306) of the granular plastomer or 35° C., whatever value is lower. Thus, if the Vicat temperature (10 N, ISO 306) of the granular plastomer is 38° C., the temperature must not exceed 34° C. However, if the Vicat temperature (10 N, ISO 306) of the granular plastomer is 40° C. or even 45° C., the maximum temperature is 35° C. Preferably, the maximum temperature is 32° C., more preferably 31° C. The minimum temperature is preferably 27° C. and more preferably 28° C., most preferably 30° C.

Preferably, the gas is injected via a gas distribution plate for the fluidized regime and the slugging regime. When a double cone regime is desired a gas distribution plate is preferably not used and the gas is injected via a nozzle from the bottom cone.

Preferably, the raw plastomer according to the present invention is produced in a solution polymerization process. It is self-explaining raw plastomers having other process history may also be treated. However, usually such raw plastomers do not contain undesirable high amounts of VOC.

In a further aspect, the plastomer according to the present invention preferably is a copolymer of ethylene and 1-octene. Copolymer of ethylene and 1-octene are known to be partially pretty sticky and to have a high tendency for agglomeration making post reactor processing steps difficult.

The intensive hydrodynamic regime preferably is selected from fluidized bed regime, slugging bed regime and double cone regime. When the gas flow rate through fixed bed is increased, the superficial gas velocity will reach a critical value denoted minimum fluidization velocity which is well known in the art. The intensive hydrodynamic regime insofar is a fluidized bed regime. At minimum fluidization, a bed can be viewed as a pseudo-liquid. Further increase of gas flow may result in bubble formation. Bubbles are gas voids with very little or even no solids included. They cause solid movement in the upwards direction to a certain height. Increase of the fluidizing velocity for a given bed results in increase of the bubble size. If the bed is relatively small in cross section, bubble size may reach nearly the diameter of the bed. If so, the relatively big bubble will pass through the bed as a slug. The criteria for slug formation are well known in the art. Reference is made Stewart, P. S. B., & Davidson, J. F. (1967). Slug flow in fluidized beds. Powder Technology, 1, 61. The intensive hydrodynamic regime insofar is a slugging regime.

When the velocity of gas is further increased and simultaneously a double cone geometry for the treatment vessel is used, a specific turbulent bed, denoted "double cone regime" will result. A cone geometry at the bottom of the treatment vessel and particularly a cone geometry at the top of the treatment vessel will guarantee significant particle deflection and also a high gas velocity close to the inner surface of the treatment vessel between the cones.

Preferably, in the process according to present invention the superficial gas velocity is at least 40 cm/s. In slugging regime the superficial gas velocity will be at least 60 cm/s and in double cone regime at least 90 cm/s.

The process according to the present invention can be run batchwise or continuously. Continuous mode means that the treatment vessel is not completely emptied and the process stopped. Continuous mode means a production in contrast to batch production. In continuous mode the process is stopped only for infrequent maintenance shutdowns. Usually the process will be run batch-wise.

In the process according to the present invention the gas used in the fast-fluidization regime is selected from the group of nitrogen, air and mixtures thereof. The use of air is preferred for commercial reasons.

In a further aspect, the treatment vessel as used in the present invention is an insulated treatment vessel. If required due to the circumstances such as low ambient temperatures, preheating of the raw granular plastomer can be used. Usually preheating of the raw granular plastomer will reduce the aeration time. Preheating insofar is preferred. Preheating denotes the use of measures for heating other than subjecting the granular raw plastomer to the intensive hydrodynamic regime at a minimum temperature of at least 20° C. and a maximum temperature of 4° C. below the Vicat temperature (10 N, ISO 306) of the granular raw plastomer or 35° C., whatever value is lower, with the temperature measured at the gas inlet to the fast-fluidization regime.

In the process according to the present invention, the entrainment from the intensive hydrodynamic regime is preferably minimized by use of at least one gas-solid separator, preferably a cyclone. However, the inventors of the present invention have also found, the solids entrainment rate is a very weak function of the superficial velocity due to the large particle size.

In a first preferred embodiment of the present invention, the volatile organic compound content of granular plastomers is reduced in the process to 20 ppm or lower, preferably to 15 ppm or lower, and most preferably to 10 ppm or lower. This embodiment aims at a plastomer with an amount of volatile organic compounds as low as possible. The treatment time of the first preferred embodiment depends on the starting material and the target VOC content as well as the treatment conditions. In the inventive process of the first preferred embodiment the treatment time is less than about 12 hours when using double cone regime and about less than 48 hours when using fluidized bed regime when starting from a raw plastomer having a VOC content of 1000 ppm.

In a second preferred embodiment of the invention, the volatile organic compound content of granular plastomers is reduced in the process to 65 ppm or lower, preferably 60 ppm or lower and most preferably 55 ppm or lower. Usually the volatile organic compound content of granular plastomers of this embodiment will be higher than 20 ppm. This embodiment aims at a plastomer with reasonable amount of volatile organic compounds achieved in a favorable short treatment time. This embodiment insofar aims at a balance of reduction of volatile organic compounds and overall process costs. In the inventive process of the second preferred embodiment the treatment time is less than about 3 hours for double cone regime and about less than 24 hours for fluidized bed regime when starting from a raw plastomer having a VOC content of 1000 ppm.

The preparation of the plastomers for the present invention is described inter alia in EP 3 023 450 incorporated by reference herewith.

The present invention also concerns an integrated process. In this integrated process the raw plastomer is produced in a solution polymerization process, the integrated process further comprises the following steps:
(i) subjecting the polymer slurry as directed obtained from the solution polymerization reactor to a first separation stage using at least one flash separation yielding a first intermediate polymer;
(ii) subjecting the first intermediate polymer into an extruder to form the granular raw plastomer, the granules having an average D50 diameter of 2.5 to 4.5 mm.

It is particularly important and of highest preference in the integrated process as described above that the extrusion step yielding the granular raw plastomer with the granules having an average D50 diameter of 2.5 to 4.5 mm precedes the step of subjecting the raw plastomer to at least one intensive hydrodynamic regime. In other words, intermediate polymer in non-solidified form, e.g. in the form of flakes must not be subjected to an intensive hydrodynamic regime.

Flash separation is well known in the art and involves significant reduction of the pressure for removing by-products and reactants such as hydrocarbons.

In the integrated process according to the present invention, the granules of the raw plastomer and/or the granules of the plastomer as recovered from the at least one intensive regime may be subjected to purge column and/or steam dryer. A purge column denotes a column, wherein the treated substrates are subjected to a stream of inert gas, such as nitrogen for removing again by-products and reactants such as hydrocarbons. Steam dryer are also well known in the art and use water steam for further the same removing again by-products and reactants such as hydrocarbons.

The present invention is further concerned with granular plastomer obtainable by the process as described above. In conventionally produced granular plastomers the individual granules show a considerable gradient as to the amount of volatiles. As expected, in conventionally produced granular plastomers the amount of volatiles is essentially zero close to the surface, whereas it is considerably high at considerable distance from the surface. The present invention allows better distribution.

The present invention insofar is also concerned with the use of the inventive process for homogenizing volatile concentration within the granules obtained.

In yet a further aspect, the present invention aims at the use of the inventive process for minimizing treatment time when reducing the volatile organic compound content of raw plastomer having a volatile organic compound content (VOC, VDA277) of above 150 ppm, to below 65 ppm (VOC, VDA277) for the resulting plastomer.

Experimental Part

Test Methods a) MFR

The melt flow rate (MFR) was determined according to ISO 1133 at 190° C. The load under which the measurement is conducted is given as the subscript. Thus, the MFR under the load of 2.16 kg is denoted as $MFR_2$. The melt flow rate $MFR_{21}$ is correspondingly determined at 190° C. under a load of 21.6 kg.

b) Density

Density was measured according to ISO 1183-1:2004 Method A on compression moulded specimen prepared according to EN ISO 1872-2 (February 2007) and is given in $kg/m^3$.

c) Volatiles VOC (VDA277)

The total emission of the plastomers was determined by using head space extraction according to VDA 277: 1995 using a gas chromatograph and a headspace method. The equipment was an Agilent gas chromatograph with a WCOT-capillary column (wax type) of 30 m length and 0.25 mm×1.0 micrometer inner diameter (1 μm film thickness). A flame ionization detector was used with hydrogen as a fuel gas. The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and carrier gas flow rate of 1 ml/min. The emission potential was measured on the basis of the sum of all values provided by the emitted substances after gas chromatography analysis and flame ionization detection with acetone as the calibration standard. Sample introduction (pellets, about 2 g) was by headspace analysis (20 ml head space vial) after conditioning at 120° C. for 5 hours prior to the measurement. The unit is microgram carbon per gram of sample, respectively ppm.

d) The Average D50 Particle Size (Plastomer Pellets)

Particle size distribution and shape evaluation were executed based on image analysis methods. The pellets were transported on a vibration table. A high speed line camera took a two-dimensional image of each particle in free falling mode. The system measured the size of these particles as the diameter of an equivalent circle. The pellets were divided into nine classes: 1000 µm, 2000 µm, 2500 µm, 3000 µm, 3500 µm, 4000 µm, 5000 µm, 6000 µm, >6000 µm. For each particle following parameters were determined: shape factor, elongation, roundness, sieve diameter, convexity and roughness. Depending on the value of these 6 parameters, the particles were divided into: pellets, clusters, tailed, multiples, long, dust, angelhair or miscuts.

The measurement of contaminants on pellets, together with pellet shape and size was done using a PA66 consisting of a PS25C and a PSSD and or an equivalent instrument set up from OCS GmbH. The PS25C and PSSD can be used independently and be considered as separate systems.

e) Flexural Modulus

The flexural modulus was determined in 3-point-bending according to ISO 178 on 80×10×4 mm$^3$ test bars injection moulded at 23° C. in line with EN ISO 1873-2.

e) Vicat Temperature

The Vicat temperature was measured according to ISO 306, method A50. A flat-ended needle loaded with a mass of 10 N is placed in direct contact with an injection moulded test specimen with the dimensions of 80×10×4 mm$^3$ as described in EN ISO 1873-2. The specimen and the needle are heated at 50° C./h. The temperature at which the needle has penetrated to a depth of 1 mm is recorded as the Vicat softening temperature.

f) Temperature

The temperature was measured with thermocouples at two sides of the gas inlet to the intensive hydrodynamic regime.

Experiments

Example 1

A plastomer (C2C8 polyolefin, density 868 kg/m$^3$, MFR (ISO1133, 190° C., 2.16 kg)=0.5 g/10 min) in granular form (average D50 diameter of 3.5 mm with method as described herein) having an initial VOC content of 1043 ppm was used for this first example.

The reduction as to VOC content was evaluated for a packed-bed column (reference; gas velocity 10 cm/s), a fluidized bed regime (superficial gas velocity 40 cm/s), a slugging bed regime (superficial gas velocity 75 cm/s) and a double cone regime (superficial gas velocity 95 cm/s). The table below summarizes the simulation results for the four columns operated with different air velocities.

The simulation was based on a dynamic model built in Fortran 90 with MSIMSL numerical library used for solving the differential equations.

TABLE 1

The variation in 1-octene concentration (normalized to the initial 1-octene concentration) when aerated in beds run with different air velocity

| | $M_{Cs}/M_{Cs,\ in}$ | | | |
|---|---|---|---|---|
| Time, hrs | Packed-bed | Fluidized-bed | Slugging bed | Double-cone |
| 0 | 1.000 | 1.000 | 1.000 | 1.000 |
| 1 | 0.750 | 0.711 | 0.670 | 0.602 |
| 2 | 0.647 | 0.590 | 0.532 | 0.437 |
| 3 | 0.575 | 0.506 | 0.431 | 0.323 |
| 4 | 0.519 | 0.440 | 0.359 | 0.233 |
| 5 | 0.475 | 0.388 | 0.295 | 0.171 |
| 6 | 0.448 | 0.353 | 0.254 | 0.126 |
| 7 | 0.422 | 0.326 | 0.221 | 0.093 |
| 8 | 0.403 | 0.309 | 0.191 | 0.070 |
| 9 | 0.390 | 0.292 | 0.167 | 0.051 |
| 10 | 0.378 | 0.279 | 0.152 | 0.037 |
| 11 | 0.370 | 0.268 | 0.134 | 0.027 |
| 12 | 0.362 | 0.259 | 0.123 | 0.020 |
| 13 | 0.357 | 0.250 | 0.109 | 0.015 |
| 14 | 0.351 | 0.243 | 0.100 | 0.011 |
| 15 | 0.346 | 0.239 | 0.091 | |
| 16 | 0.342 | 0.233 | 0.081 | |
| 17 | 0.338 | 0.228 | 0.073 | |
| 18 | 0.333 | 0.223 | 0.063 | |
| 19 | 0.330 | 0.220 | 0.056 | |
| 20 | 0.325 | 0.215 | 0.046 | |
| 21 | 0.322 | 0.211 | 0.039 | |
| 22 | 0.319 | 0.206 | 0.030 | |
| 23 | 0.317 | 0.203 | 0.022 | |
| 24 | 0.313 | 0.199 | 0.014 | |
| 25 | 0.310 | 0.194 | | |
| 26 | 0.307 | 0.191 | | |
| 27 | 0.303 | 0.186 | | |
| 28 | 0.300 | 0.184 | | |
| 29 | 0.297 | 0.179 | | |
| 30 | 0.294 | 0.176 | | |
| 31 | 0.291 | 0.171 | | |
| 32 | 0.287 | 0.169 | | |
| 33 | 0.285 | 0.164 | | |
| 34 | 0.280 | 0.161 | | |
| 35 | 0.278 | 0.156 | | |
| 36 | 0.274 | 0.154 | | |
| 37 | 0.272 | 0.149 | | |
| 38 | 0.268 | 0.146 | | |
| 39 | 0.264 | 0.141 | | |
| 40 | 0.261 | 0.136 | | |
| 41 | 0.261 | 0.131 | | |
| 42 | 0.257 | 0.127 | | |
| 43 | 0.253 | 0.127 | | |
| 44 | 0.249 | 0.122 | | |
| 45 | 0.246 | 0.117 | | |
| 46 | 0.242 | 0.112 | | |
| 47 | 0.238 | 0.112 | | |
| 48 | 0.238 | 0.107 | | |

Example 2

Example 2 shows the variations in 1-octene normalized concentration inside polymer pellets because of aeration utilizing different air superficial velocities, i.e. fluidization regime. The simulations prove that the variation in hydrocarbon concentration inside the pellets is the steepest when aeration takes place under double-cone conditions. In this case, the mass transfer from the pellets to the air is the maximum that reduces the surface concentration of octane ending with almost no octane at the surface of the pellets. Consequently, this enhances the diffusion of octane from the pellets' center the pellets' surface, see the table below. By decreasing air velocity, i.e. moving from double cone towards packed bed regime, the rate of hydrocarbons removal from the pellets to the air decreases; nevertheless, considerable removal is still detectable when sludging or fluidized bed conditions are utilized compared with packed bed one. This results in less removal of hydrocarbons from the pellets and consequently higher concentrations inside the pellets.

TABLE 2

The variation in normalized 1-octene concentration inside polymer pellets resulting from aeration with different air velocities

| | $M_{C8}/M_{C8in}$ | | | |
|---|---|---|---|---|
| Dimensionless Radius | Packed bed | Fluidized bed | Slugging bed | Double cone |
| 0.000 | 0.529 | 0.453 | 0.370 | 0.251 |
| 0.008 | 0.529 | 0.453 | 0.370 | 0.251 |
| 0.041 | 0.529 | 0.453 | 0.370 | 0.250 |
| 0.099 | 0.527 | 0.451 | 0.368 | 0.248 |
| 0.179 | 0.523 | 0.446 | 0.362 | 0.241 |
| 0.276 | 0.514 | 0.436 | 0.350 | 0.228 |
| 0.385 | 0.500 | 0.419 | 0.331 | 0.206 |
| 0.500 | 0.482 | 0.397 | 0.305 | 0.177 |
| 0.615 | 0.459 | 0.371 | 0.273 | 0.143 |
| 0.724 | 0.434 | 0.342 | 0.239 | 0.105 |
| 0.821 | 0.411 | 0.315 | 0.206 | 0.070 |
| 0.901 | 0.390 | 0.291 | 0.178 | 0.039 |
| 0.959 | 0.375 | 0.274 | 0.157 | 0.016 |
| 0.992 | 0.367 | 0.264 | 0.144 | 0.003 |
| 1.000 | 0.364 | 0.261 | 0.141 | 0.000 |

The invention claimed is:

1. A process for reducing the volatile organic compound content of plastomer having:
    a density of equal to or lower than 883 kg/m³ (ISO 1183-1:2004 Method A on compression moulded specimen prepared according to EN ISO 1872-2; February 2007) and
    a MFR$_2$ of 100.0 g/10 min or lower (ISO 1133 at 2.16 kg load and 190° C.);
    to below 65 ppm (VOC, VDA277), the process comprising the steps of
    a) providing raw plastomer in granular form, the raw plastomer having a density of equal to or lower than 883 kg/m³; and
    a MFR$_2$ of 100.0 g/10 min or lower (ISO 1133 at 2.16 kg load and 190° C.); and
    a volatile organic compound content (VOC, VDA277) of above 150 ppm, and
    the granules having an average D50 diameter of 2.5 to 4.5 mm measured by image analysis
    b) subjecting said granular raw plastomer to at least one intensive hydrodynamic regime selected from fluidized bed regime, slugging bed regime, and double cone regime,
    wherein the superficial gas flow velocity is higher than the minimum fluidization velocity and is at least 40 cm/s, and at a minimum temperature of at least 20° C. and a maximum temperature of 4° C. below the Vicat temperature (10 N, ISO 306) of the granular raw plastomer or 35° C., whatever value is lower, with the temperature measured at the gas inlet to the fast-fluidization regime,
    c) recovering the granular plastomer.

2. The process according to claim 1, wherein the raw plastomer is produced in a solution polymerization process.

3. The process according to claim 1, wherein the plastomer is a copolymer of ethylene and 1-octene.

4. The process according to claim 1, whereby in the slugging bed regime the superficial gas velocity is at least 60 cm/s and whereby in the double cone regime the superficial gas velocity is at least 90 cm/s.

5. The process according to claim 1, wherein the gas used in the fast-fluidization regime is selected from the group of nitrogen, air and mixtures thereof.

6. The process according to claim 1, wherein the treatment vessel is an insulated treatment vessel.

7. The process according to claim 1, whereby the raw plastomer in granular form is preheated.

8. The process according to claim 1, wherein the entrainment from the intensive hydrodynamic regime is minimized by use of at least one gas-solid separator.

9. The process according to claim 1, wherein the plastomer has a density of equal or lower than 870 kg/m³ (ISO 1183-1:2004 Method A on compression moulded specimen prepared according to EN ISO 1872-2; February 2007).

10. The process according to claim 1, wherein the raw plastomer is produced in a solution polymerization process, the process further comprising
    (i) subjecting the polymer slurry as directed obtained from the solution polymerization reactor into a first separation stage using at least one flash separation yielding a first intermediate polymer;
    (ii) subjecting the first intermediate polymer into an extruder to form the granular raw plastomer, with the granules of the raw plastomer having an average D50 diameter of 2.5 to 4.5 mm measured by image analysis.

11. The process according to claim 1, wherein the granules of the raw plastomer and/or the granules of the plastomer as recovered from the at least one inventive hydrodynamic regime are subjected to purge column and/or steam dryer.

12. The process according to claim 1, for homogenizing volatile concentration within the granules obtained.

13. The process according to claim 1, for minimizing treatment time when reducing the volatile organic compound content of raw plastomer having a volatile organic compound content (VOC, VDA277) of above 150 ppm, to below 65 ppm (VOC, VDA277) for the resulting plastomer.

* * * * *